(12) United States Patent
Takenaga (10) Patent No.: US 6,993,560 B2
(45) Date of Patent: Jan. 31, 2006

(54) SYSTEM AND METHOD FOR INCORPORATING AD INFORMATION INTO AN E-MAIL

(75) Inventor: Takashi Takenaga, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 789 days.

(21) Appl. No.: 09/850,114

(22) Filed: May 8, 2001

(65) Prior Publication Data

US 2001/0044830 A1  Nov. 22, 2001

(30) Foreign Application Priority Data

May 17, 2000 (JP) .......................... P.2000-144330

(51) Int. Cl.
*G06F 345/619* (2006.01)
(52) U.S. Cl. ............... 709/206; 709/206; 709/204; 709/219; 345/619
(58) Field of Classification Search ............... 707/104, 707/10; 379/93.1; 345/619; 709/206, 218

See application file for complete search history.

(56) References Cited

U.S. PATENT DOCUMENTS

| | | | |
|---|---|---|---|
| 6,263,343 B1 * | 7/2001 | Hirono | 707/104.1 |
| 6,360,221 B1 * | 3/2002 | Gough et al. | 707/10 |
| 6,498,982 B2 * | 12/2002 | Bellesfield et al. | 701/202 |
| 6,505,203 B1 * | 1/2003 | Adler | 707/10 |
| 6,577,714 B1 * | 6/2003 | Darcie et al. | 379/93.17 |
| 6,684,088 B1 * | 1/2004 | Halahmi | 455/566 |
| 2002/0063723 A1 * | 5/2002 | Hirono | 245/619 |

FOREIGN PATENT DOCUMENTS

JP   11-259390   *   9/1999

* cited by examiner

*Primary Examiner*—Rupal Dharia
*Assistant Examiner*—Djenane Bayard
(74) *Attorney, Agent, or Firm*—Sughrue Mion, PLLC (57) ABSTRACT

In a system and a method for incorporating ad information into e-mails while they are being exchanged, whether area information b is contained in an e-mail M transmitted from a terminal T1 or not is detected. When the area information b is contained, position information indicating the display range of the area information is retrieved. Based on the position information, ad information positioned in the display range of the area information is retrieved. Then ad data c contained in the retrieved ad information is inserted into the e-mail M.

13 Claims, 6 Drawing Sheets

| LEVEL | AREA | POSITION INFORMATION |
|---|---|---|
| 1 | KANTO | XX° XX" NORTH LATITUDE AND XX° XX" EAST LONGITUDE |
| 2 | TOKYO | XX° XX" NORTH LATITUDE AND XX° XX" EAST LONGITUDE |
| 3 | OHTA-KU | XX° XX" NORTH LATITUDE AND XX° XX" EAST LONGITUDE |
| 4 | KAMATA | WITHIN A RADIUS OF △ KILOMETERS FROM XX° XX" NORTH LATITUDE AND XX° XX" EAST LONGITUDE |

FIG. 4

| AD DATA | POSITION DATA |
|---|---|
| AD A | XX° XX" NORTH LATITUDE AND XX° XX" EAST LONGITUDE |
| AD B | XX° XX" NORTH LATITUDE AND XX° XX" EAST LONGITUDE |
| AD C | XX° XX" NORTH LATITUDE AND XX° XX" EAST LONGITUDE |
| AD D | XX° XX" NORTH LATITUDE AND XX° XX" EAST LONGITUDE |

SYSTEM AND METHOD FOR INCORPORATING AD INFORMATION INTO AN E-MAIL

BACKGROUND OF THE INVENTION

1. Field of the Invention

The present invention relates to a system and a method for incorporating ad information into e-mails while they are being exchanged. The present disclosure relates to the subject matter contained in Japanese Patent Application No. 2000-144330 filed May 17, 2000, which is incorporated herein by reference in its entirety.

2. Description of the Related Art

In recent years, with the expansion of networks such as the internet (hereinafter referred to as networks), use of the e-mail service has been in widespread use as means for transmitting information.

The e-mail service is a system whereby terminals such as microcomputers exchange text or voice information in the form of the e-mail via a network. When an e-mail with the destination (e-mail address) of the receiving terminal specified is transmitted from the sending terminal, the e-mail is saved in an e-mail exchange server.

The e-mail exchange server, accessed by the receiving terminal having the e-mail address specified in the e-mail, transmits the saved e-mail.

A transmitted e-mail may directly sent to the e-mail server for a destination receiving terminal. In this case, the receiving terminal accesses the e-mail server to receive the e-mail.

While an e-mail according to the related art is transmitted to the receiving terminal as it is, use of an e-mail as an ad medium has been examined. It is desired that an e-mail receiver can be provided with ads having high utility value and an ad provider thus can expect high ad effects.

SUMMARY OF THE INVENTION

The invention has been proposed in order to satisfy the aforementioned need for the e-mail.

The invention aims at use of e-mails as an ad medium whereby an e-mail receiver can be provided with ads having high utility value and an ad provider thus can expect high ad effects.

A system for incorporating ad information into e-mails according to a first aspect of the invention is characterized by comprising, in order to attain the object, at an e-mail site including an e-mail server for saving an e-mail transmitted from a sending terminal and transmitting the e-mail to a receiving terminal based on a transmission request made by the receiving terminal, area information detecting means for detecting whether an e-mail transmitted from the sending terminal contains area information or not, a position information database that stores position information indicating the display range of area information displayed in the e-mail, an ad information database where ad information containing ad data and position data of the ad provider is stored, and ad information inserting means for retrieving position information on the area information from said position information database when it is detected that the e-mail contains area information by said area information detecting means, retrieving ad information positioned in the display range of area information indicated by the retrieved position information from said ad information database based on the position data of ad information, and inserting ad data contained in the retrieved ad information into the e-mail.

A system for incorporating ad information into e-mails according to the first aspect of the invention applies to an e-mail exchange system via a computer network such as the internet and implemented at an e-mail site that supervises transmission/reception of e-mails.

An e-mail site that saves an e-mail transmitted from a sending terminal and transmits the e-mail to a receiving terminal based on a transmission request made by the receiving terminal, or transmits a received e-mail to a receiving party, that is, a destination e-mail site without saving the e-mail, on receiving an e-mail from a sending terminal via a computer network, uses the area information detecting means to detect whether this e-mail contains area information related with the e-mail body such as a map and traffic facilities or not.

When the area information detecting means has detected that the e-mail contains area information, the ad information inserting means retrieves position information corresponding to the area information contained in the e-mail from the position information database that stores position information specifying the display range of a map, for example, contained in the area information.

The ad information inserting means retrieves ad information having position information contained in the display range of area information specified by the position information, based on position information retrieved from the position information database, and inserts ad data such as banner ads contained in the retrieved ad information into an e-mail.

The e-mail where ad information corresponding to area information is inserted is transmitted to a receiving terminal when a transmission request is made by the receiving terminal, or transmitted to a destination e-mail server where said e-mail is displayed together with the e-mail body and area information such as a map.

According to the first aspect of the invention, in case area information such as a map is contained in an e-mail that is exchanged during exchange of e-mails, ad information related to this area information is automatically inserted. The receiving party that has received this e-mail can obtain ad information related to the area as well as the area information, thus upgrading the convenience of utilizing the area information. Further, an ad provider can provide with the user with ad information having high utility value and thus can expect high ad effects.

A system for incorporating ad information into e-mails according to a second aspect of the invention is characterized in that said area information is display of a map, traffic facilities and/or an address, on top of the first configuration, in order to attain the object.

According to the system for incorporating ad information into e-mails according to a second aspect of the invention, in case the e-mail contains display of a map, traffic facilities and/or an address related to the e-mail body, ads on contained in the map, positioned along the traffic facilities or corresponding to the address are automatically inserted into the e-mail.

A system for incorporating ad information into e-mails according to a third aspect of the invention is characterized in that position information stored in the position information database specifies the display range of area information by latitude and longitude and that the position information database specifies the display range of area information by using the latitude range and longitude range as parameters to store position information corresponding to the area information, on top of the first configuration, in order to attain the object.

A system for incorporating ad information into e-mails according to a fourth aspect of the invention is characterized in that ad data contained in the ad information stored in said ad information database is banner ad information and that a receiving party at the receiving terminal can obtain ad data corresponding to the banner ad via a computer network by clicking on the banner ad section inserted into this e-mail, on top of the first configuration, in order to attain the object.

A system for incorporating ad information into e-mails according to a fifth aspect of the invention is characterized in that position data contained in the ad information stored in said ad information database specifies the position of an ad provider by latitude and longitude and that ad data contained in the display range of this area information is retrieved by using latitude and longitude as parameters when position information in the area information inserted into the e-mail specifies the display range of the area information by using the latitude range and longitude range, on top of the first configuration, in order to attain the object.

A system for incorporating ad information into e-mails according to a sixth aspect of the invention is characterized by further comprising display format detecting means for detecting the area information display format of an e-mail at a receiving terminal as the source of an e-mail transmission request when an e-mail transmission request is made by the receiving terminal or when the e-mail is transmitted to a destination e-mail server, and display format converting means for converting the display format of the area information in the e-mail to be transmitted to the receiving terminal to the display format of the receiving terminal when it is detected that the display format of the receiving terminal differs from the display format of the area information in the e-mail transmitted from the sending terminal.

The system for incorporating ad information into e-mails according to the sixth aspect of the invention detects the area information display format of an e-mail at a receiving terminal when transmitting the e-mail where ad data is inserted is to the receiving terminal based on a transmission request or when transmitting an e-mail to a destination e-mail server without saving the e-mail. The system uses display format display means to convert the display format of the area information in the e-mail to be transmitted to the receiving terminal to the display format of the receiving terminal when it is detected by the display format detecting means that the display format of the receiving terminal differs from the display format of the area information in the e-mail to be transmitted.

Thus, according to the sixth aspect of the invention, it is ensured that area information is displayed at the receiving terminal, thus encouraging the use of related ads.

A method for incorporating ad information into e-mails according to a seventh aspect of the invention is characterized by comprising, in order to attain the object, at an e-mail site including an e-mail server for saving an e-mail transmitted from a sending terminal and transmitting the e-mail to a receiving terminal based on a transmission request made by the receiving terminal, a step of detecting whether an e-mail transmitted from the sending terminal contains area information or not, a step of retrieving position information corresponding to the area information contained in the e-mail from the position information database that stores position information indicating the display range of area information when it is detected that area information is contained in the e-mail, a step of retrieving ad information positioned in the display range of said area information from the ad information database where ad information containing ad data and position data of the ad provider is stored, based on the position data and the position information of said retrieved area information, and a step of inserting ad data contained in the retrieved ad information into the e-mail.

According to the method for incorporating ad information into e-mails according to the seventh aspect of the invention, in case area information such as a map is contained in an e-mail to be exchanged, ad information related to this area information is automatically inserted, thus encouraging the use of an e-mail as an ad medium. The receiving party that has received this e-mail can obtain ad information related to the area as well as the area information, thus upgrading the convenience of utilizing the area information. Further, an ad provider can provide with the user with ad information having high utility value and thus can expect high ad effects.

A method for incorporating ad information into e-mails according to an eighth aspect of the invention is characterized by comprising a step of specifying the display range of area information by latitude and longitude, on top of the seventh configuration, in order to attain the object. Via this method, it is possible to retrieve ad information related to area information by using the latitude and longitude as parameters.

A method for incorporating ad information into e-mails according to a ninth aspect of the invention is characterized by comprising a step of specifying the position of the ad provider of said ad data by latitude and longitude, on top of the seventh configuration, in order to attain the object. Via this method, it is possible to retrieve ad information related to area information by using the latitude and longitude as parameters when the display range of area information is specified by latitude and longitude.

A method for incorporating ad information into e-mails according to a tenth aspect of the invention is characterized by comprising a step of inserting said ad data into an e-mail transmitted from a sending terminal before saving the e-mail or before transmitting the e-mail to a destination e-mail server, on top of the seventh configuration, in order to attain the object. Via this method, it is possible to promptly transmit an e-mail where ad data is inserted to a receiving terminal when an e-mail transmission request is made by the receiving terminal.

A method for incorporating ad information into e-mails according to an eleventh aspect of the invention is characterized by comprising a step of detecting the area information display format of an e-mail at a receiving terminal as the source of an e-mail transmission request when an e-mail transmission request is made by the receiving terminal or when the e-mail is transmitted to a destination e-mail server, and a step of converting the display format of the area information in the e-mail to be transmitted to the receiving terminal to the display format of the receiving terminal when it is detected that the display format of the receiving terminal differs from the display format of the area information in the e-mail transmitted from the sending terminal, on top of the seventh configuration, in order to attain the object. Via this method, it is ensured that area information is displayed at the receiving terminal, thus encouraging the use of related ads.

DETAILED DESCRIPTION OF THE PREFERRED EMBODIMENTS

The most preferable embodiments of the invention will be explained below referring to the drawings.

Figure 1:
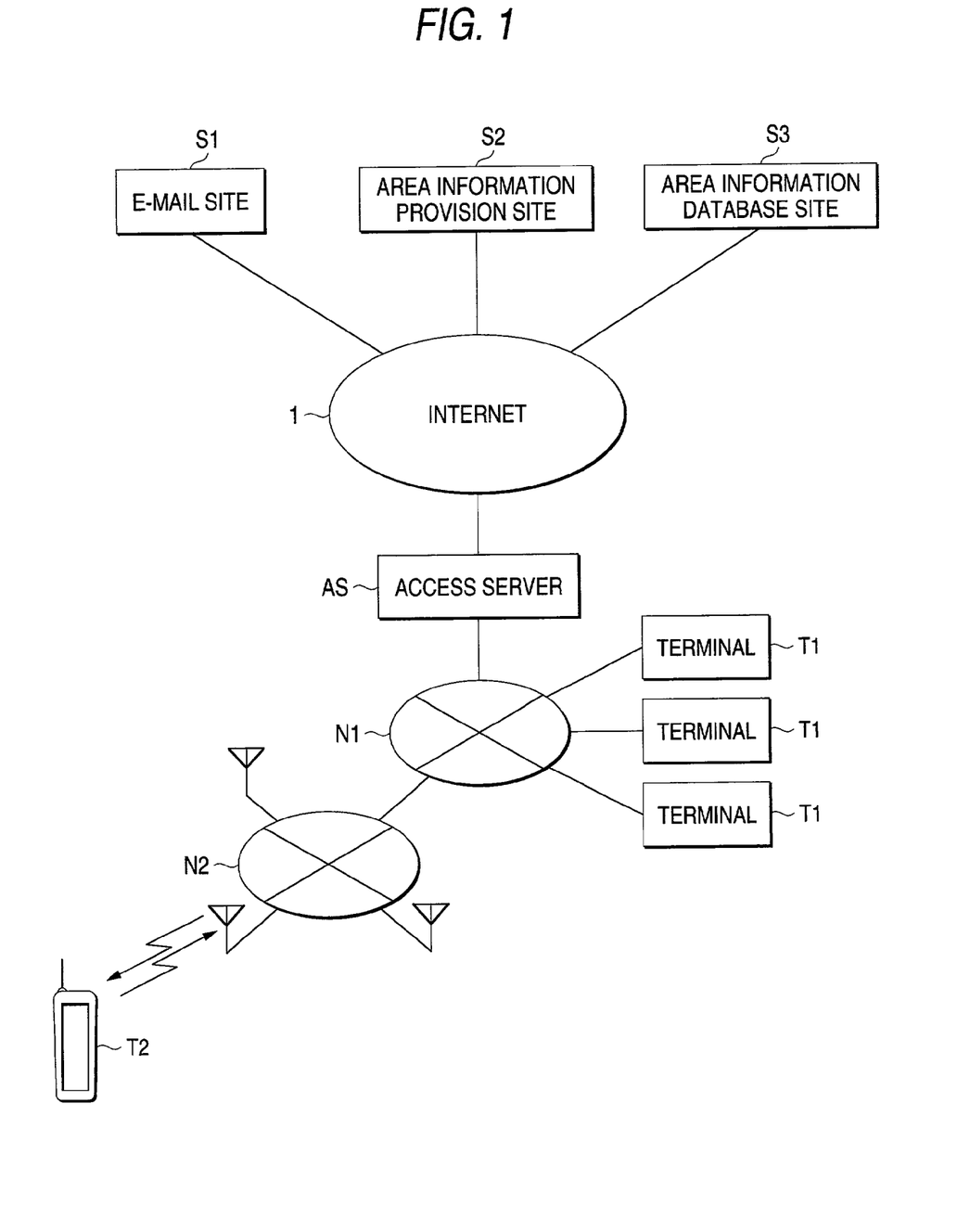
FIG. 1 is a system configuration diagram showing an embodiment of a system for incorporating ad information into e-mails according to the invention.

FIG. 1 is a system configuration diagram showing an embodiment of a system for incorporating ad information into e-mails according to the invention.

In FIG. 1, each of the terminals T1 such as microcomputers as information retrieval apparatus is connected to a public telephone network N1, which is connected to the internet 1 via an access server AS of a network service provider (NSP).

To the public telephone network N1, a portable terminal T2 such as a PDA (Personal Digital Assistant) and a portable telephone set equipped with the e-mail feature (such as portable telephone sets supporting i-mode feature) is connected via a mobile communications network N2.

An e-mail site S1 is connected to the internet I.

Figure 2:
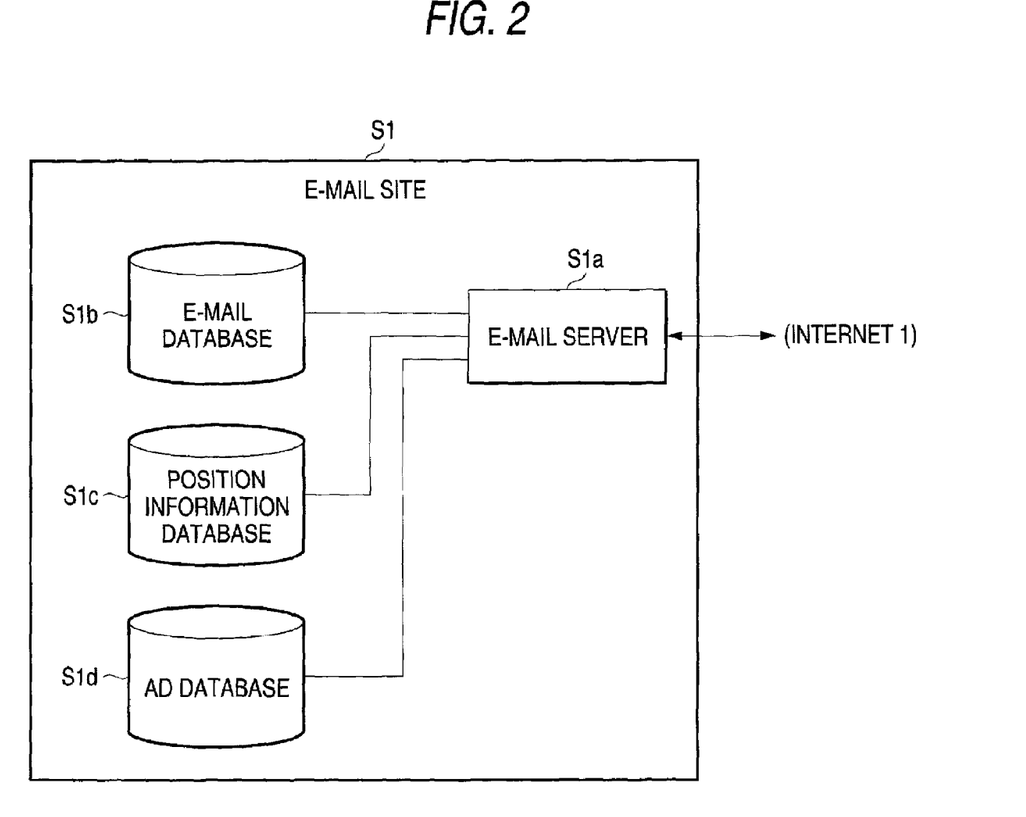
FIG. 2 is s system configuration diagram showing an e-mail site according to the embodiment.

The e-mail site S1 saves e-mails transmitted from a sending terminal T1 or a portable terminal T2 via the internet I together with the destination e-mail addresses, and transmits the saved e-mails to the terminal T1 or portable terminal T2 according to a transmission request made by the receiving terminal T1 or portable terminal T2. As shown in FIG. 2, the e-mail site S1 comprises an e-mail server S1a for supervising transmission/reception of e-mails at the e-mail site S1, an e-mail database S1b for saving e-mails transmitted to the e-mail site S1 together with the destination e-mail addresses, a position information database S1c that stores position information specifying the display range of area information such as a map and traffic facilities by latitude and longitude, and an ad information database S1d that stores ad information specifying an ad and the position of an ad provider (position of the store).

In FIG. 1, S2 represents an area information provision site equipped with a WWW server that provides area information such as a map, traffic facilities and/or an address. S3 represents an area information database site that stores information containing a map and traffic facilities.

Figure 3:
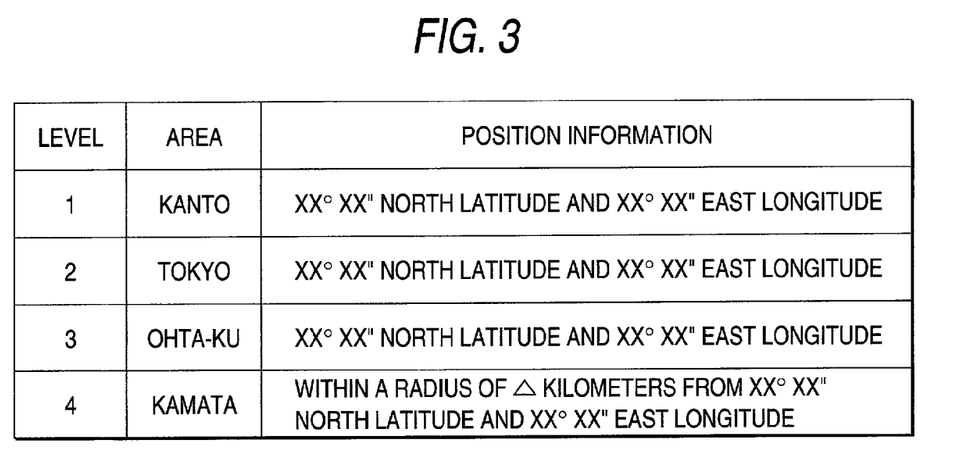
FIG. 3 is an explanatory drawing that shows an example of position information stored in the position database at the e-mail site according to the embodiment.

FIG. 3 shows an example of position information stored in the position database S1c at the e-mail site S1. FIG. 3 shows position information in hierarchical order on the area around Kamata Station, Ohta-ku, Tokyo.

In FIG. 3, "Level" indicates a layer of position information. Position information on a wide are a is shown from the highest level (Level 1). In the position information, the range of area in each level is represented by latitude and longitude, for example XX° XX" North Latitude and XX° XX" East Longitude.

Figure 4:
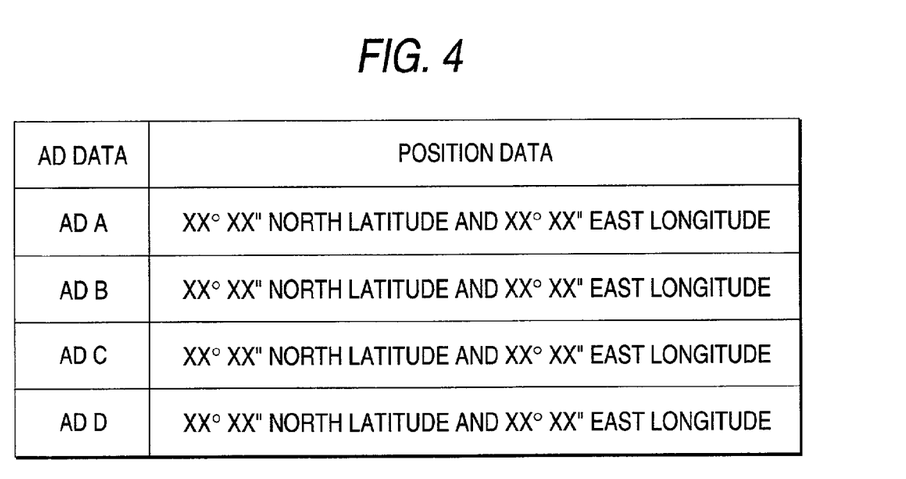
FIG. 4 is an explanatory drawing that shows an example of ad information stored in the ad information database at the e-mail site according to the embodiment.

FIG. 4 shows an example of ad information stored in the ad information database at the e-mail site S1. FIG. 4 shows ad data and the latitude and longitude showing the position of the store to be advertised and sales area of articles (hereinafter referred to as the position of an ad provider).

Transmission/Reception of e-mails will be explained referring to FIG. 5 that shows an aspect of e-mails to be transmitted/received and flowcharts in FIGS. 6 and 7 that show procedures for transmitting/receiving e-mails at the e-mail server S1a.

Figure 5:
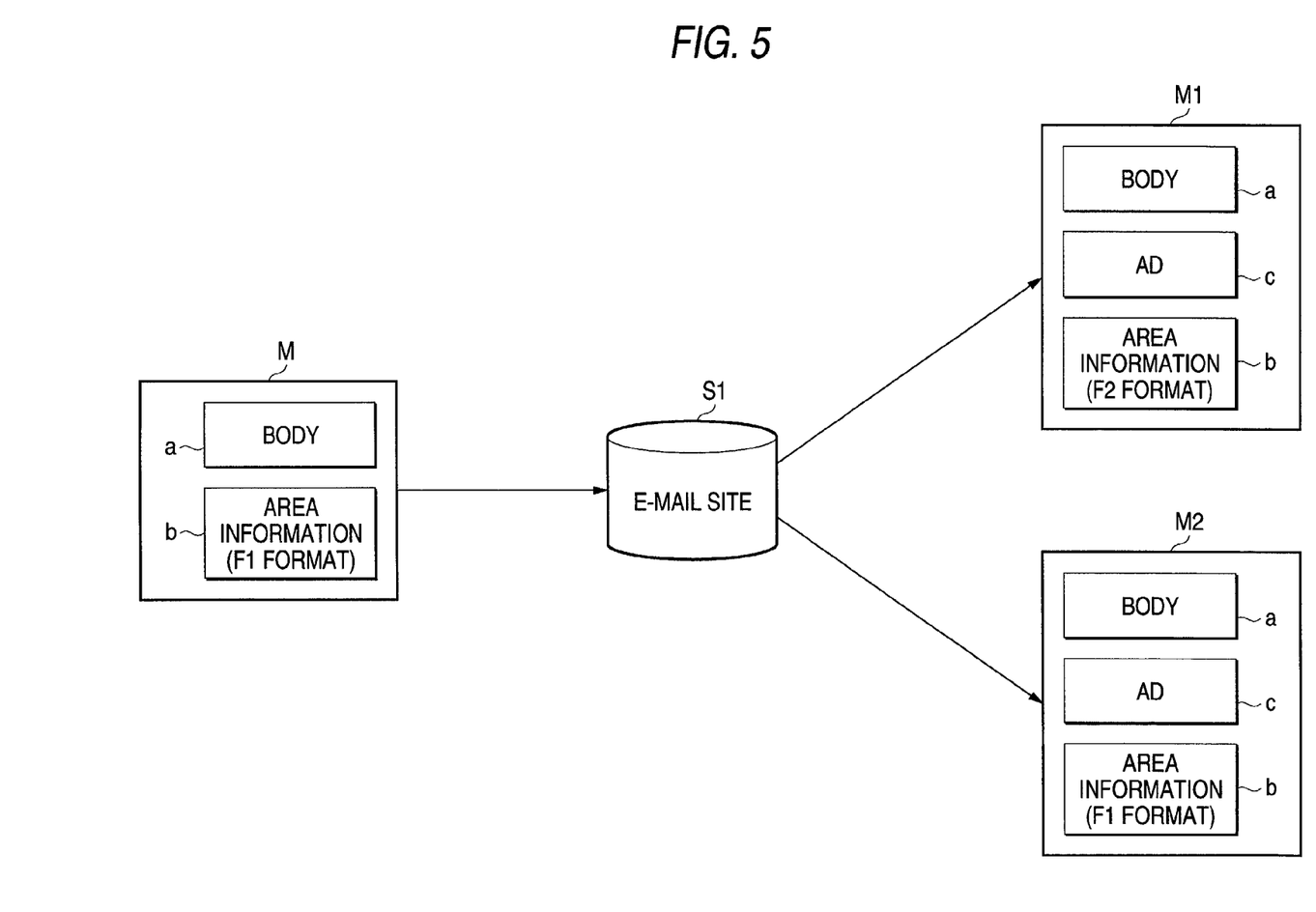
FIG. 5 is an explanatory drawing that shows an aspect of e-mails to be transmitted/received according to the embodiment.

As shown in FIG. 5, the e-mail M contains an e-mail body entry column a and a column b for displaying area information inserted by an e-mail sender.

In the area information display column b, area information such as the map, traffic facilities and/or address of a desired area that the sender of the e-mail M has obtained from the area information provision site and the area information database site S3 via electronic dictionaries and/or the internet (see FIG. 1).

In the following description, the display format for displaying area information in a terminal T1 or a terminal T2 (see FIG. 1) that transmits the e-mail M is assumed to be Format F1 (for example MapFan Format).

Figure 6:
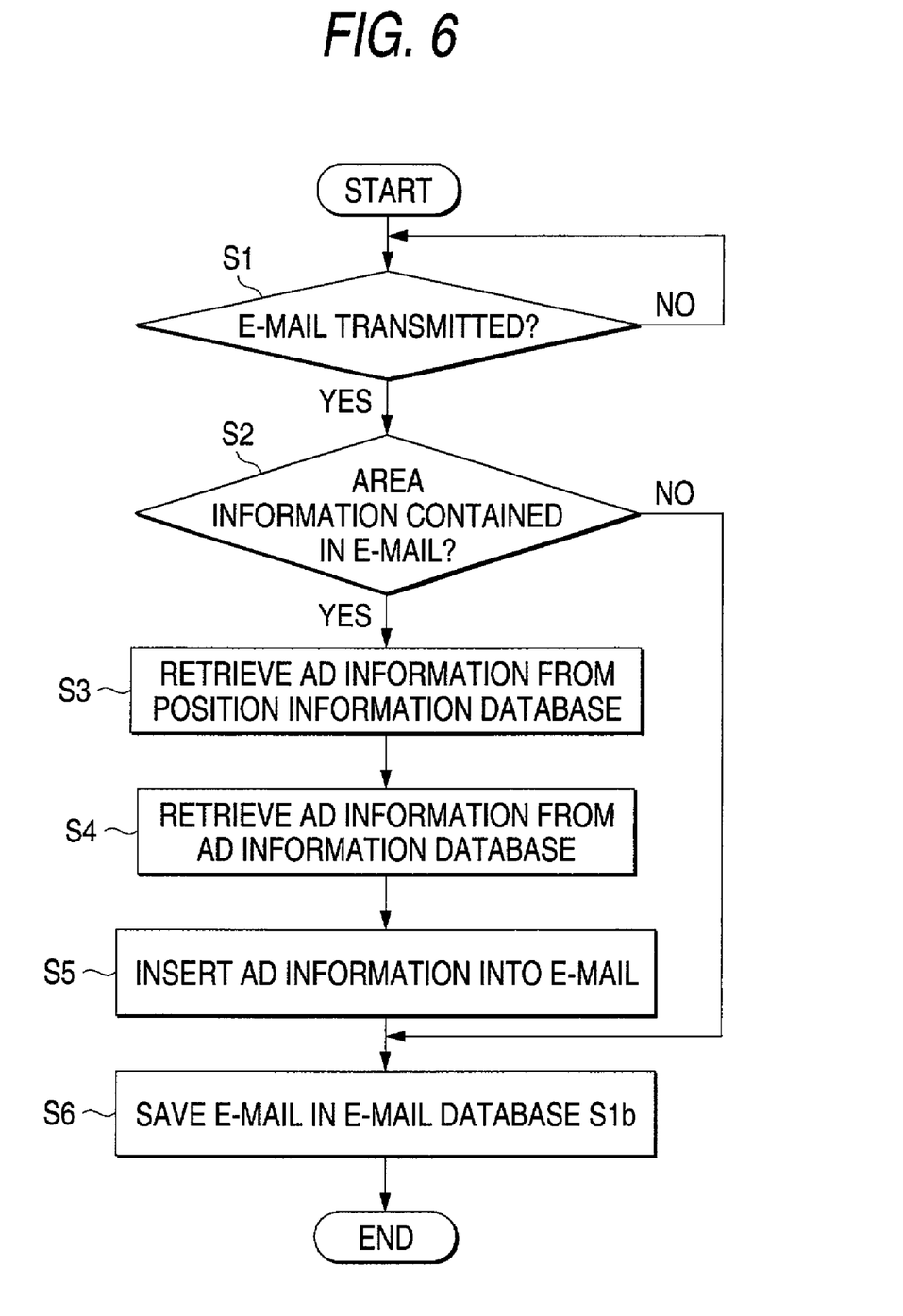
FIG. 6 is a flowchart showing an example of insertion of an ad into an e-mail according to the embodiment.

FIG. 6 shows the procedure for saving a transmitted e-mail at the e-mail site S1. In FIG. 6, the e-mail server S1a of the e-mail site S1 determines whether the e-mail M has been transmitted from the terminal T1 or terminal T2 or not (step s1). In case affirmative, the e-mail server S1a determines whether the e-mail M displays area information in the display area b or not (step s2).

In case area information is displayed in the display column b of the e-mail M, the e-mail server S1a accesses the position information database S1c and retrieves the position information (latitude and longitude range) corresponding to the area information (for example, a map of Kamata) displayed in the display column b from the position data shown in FIG. 3, then reads the received position information (step s3).

Further, the e-mail server S1a accesses the ad information database S1d and retrieves ad information where a position (latitude and longitude) corresponding to the ad data is contained in the latitude and longitude range indicated by the position information read from the position information database S1c, from the ad information shown in FIG. 4, then reads the retrieved ad information (step s4).

The e-mail server S1a inserts, as a banner ad, the ad data indicated by the ad information read from the ad information database S1d as mentioned earlier into the ad column of the e-mail M mentioned later (step s5), then saves the e-mail where this banner ad is inserted to the e-mail database S1d together with the destination e-mail address (step s6).

Figure 7:
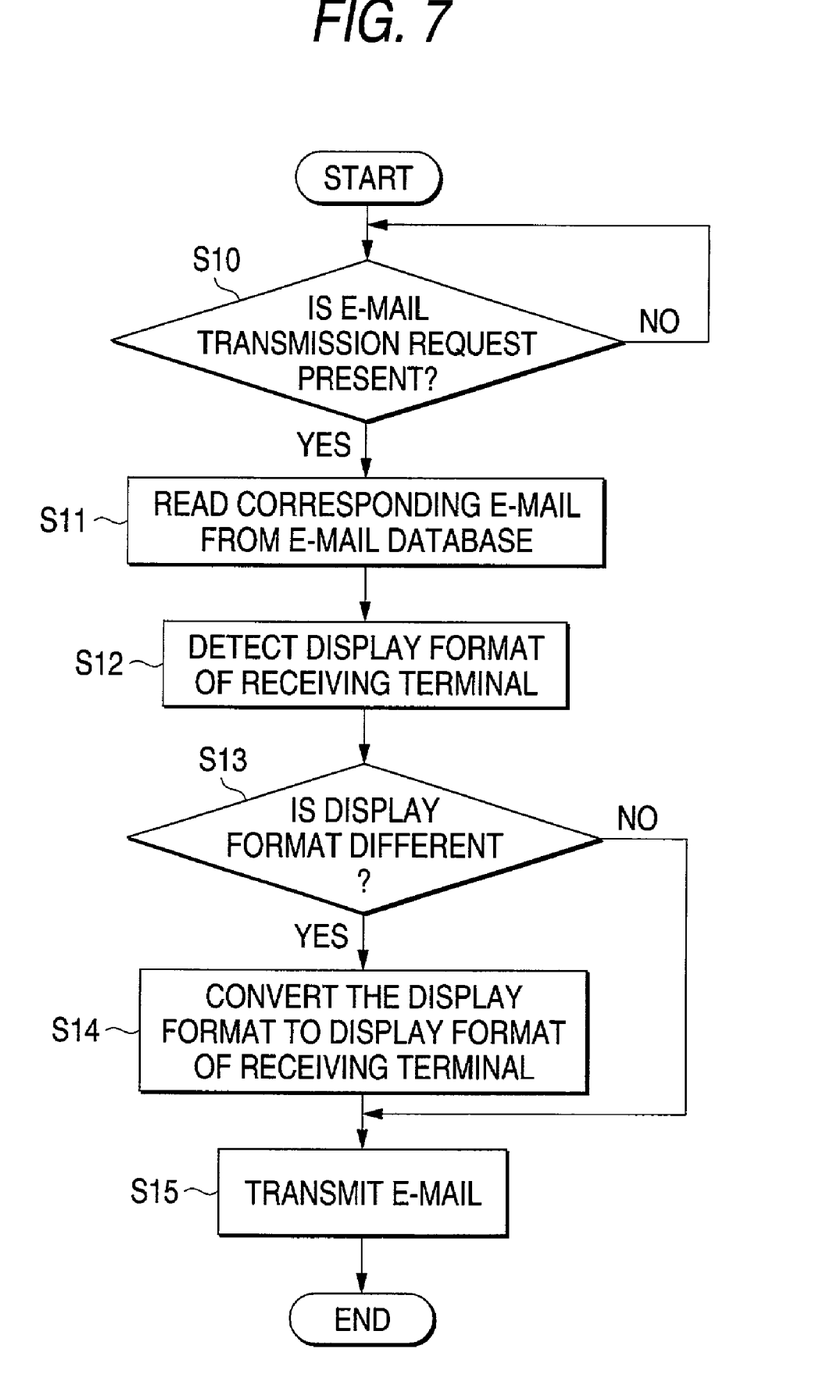
FIG. 7 is a flowchart showing an example of conversion of display format of area information according to the embodiment.

FIG. 7 shows the procedure for transmitting an e-mail from the e-mail site S1 to a receiving terminal.

In FIG. 7, the e-mail server S1a determines whether a transmission request has been made by a terminal T1 or a portable terminal T2 (see FIG. 1) (step s10), and in case affirmative, the e-mail server S1a accesses the e-mail database S1b and reads the e-mails corresponding to the e-mail address of the terminal T1 or portable terminal T2 that has made a transmission request (step s11).

Further, the e-mail server S1a detects the display format that can be processed by the terminal T1 or portable terminal T2 that has made a transmission request (steps 12) and determines whether the detected display format differs from the display format (in this example MapFan format) F1 of area information of the e-mail read from the e-mail database S1b or not (step s13)

In case the detected display format differs from the display format of area information of the e-mail read from the e-mail database S1b, the e-mail server S1a converts the display format F1 of area information of the e-mail to the display format F2 (for example Mapion format) (step S14), then transmits the e-mail M1 to the terminal T1 or portable terminal T2 that has made a transmission request (step s15).

In case the display format of area information is the same, the e-mail server S1a transmits the e-mail M2 as it is to the terminal T1 or portable terminal T2 that has made a transmission request (step s15).

Conversion of the display format of the area information is possible via a variety of known systems.

As mentioned earlier, as shown in FIG. 5, to the terminal T1 or portable terminal T2 that has made a transmission request, is transmitted an e-mail T1 or T2 where ad data related to area information such as a map, traffic facilities and/or an address displayed in the display column b is inserted in the ad column c and the display format of the area information displayed n the display column b conforms to the display format of area information in the terminal T1 or portable terminal T2 that has made a transmission request.

A receiving party that has received an e-mail M1 or M2 where ad data related to area information is inserted as mentioned earlier can obtain ad data related to the area as well as the area information, thus upgrading the convenience of utilizing the area information.

Further, an ad provider can automatically provide with the user with ad information having high utility value. This encourages the use of an e-mail as an ad medium.

While ad data is inserted into an e-mail M as an banner ad in the aforementioned example, ad data may be inserted into a page separate from the e-mail body so that it is displayed on the entire screen of a receiving terminal or ad data may be inserted as an attached file.

While ad data is inserted into an e-mail M when the e-mail M is saved into the e-mail database S1b of the e-mail M at the e-mail site S1 in the aforementioned example, by which procedure the e-mail site S1 can promptly transmit the saved e-mail M to a receiving terminal when said receiving terminal has made an access to the e-mail site S1, ad data may be inserted into the e-mail M when the e-mail M is read from the e-mail database S1b for transmission to a receiving terminal.

While an e-mail transmitted from a sending terminal is once saved in the e-mail database S1b in the aforementioned example, ad data may be inserted the same way in case the e-mail is not saved in the e-mail database S1b but transmitted to a destination e-mail server.

While conversion of the display format of area information is made by detecting the display format of a receiving terminal that has accessed the e-mail site S1 in the aforementioned example, information for identifying the display format of a receiving terminal may be inserted into an e-mail M at a sending terminal and the e-mail site S1 may convert the display format of area information based on the identification information inserted into this e-mail M.

In this case, the transmitted e-mail M may be saved into the e-mail database S1b with the display format of the area information converted beforehand to a format conforming to the display format of a sending terminal at the e-mail site S1 so that the e-mail site S1 can promptly transmit the saved e-mail M to a receiving terminal promptly when the receiving terminal has made an access to the e-mail site S1.

What is claimed is:

1. A system for incorporating ad information into e-mails, comprising:

at an e-mail site including an e-mail server for saving an e-mail transmitted from a sending terminal and transmitting the e-mail to a receiving terminal based on a transmission request made by the receiving terminal;

an area information detector for detecting whether an e-mail transmitted from the sending terminal contains area information or not;

a position information database that stores position information indicating the display range of area information displayed in the e-mail;

an ad information database where ad information containing ad data and position data of an ad provider is stored; and an ad information inserting section for:

retrieving position information on the area information from said position information database when it is detected that the e-mail contains area information, retrieving, from said ad information database, ad information positioned in the display range of the area information indicated by the retrieved position information, based on the position data of ad information, and inserting ad data contained in the retrieved ad information into the e-mail.

2. The system for incorporating ad information into e-mails according to claim 1, wherein said area information is display of a map, traffic facilities and/or an address.

3. The system for incorporating ad information into e-mails according to claim 1, wherein position information stored in the position information database specifies the display range of area information by latitude and longitude.

4. The system for incorporating ad information into e-mails according to claim 1, wherein ad data contained in the ad information stored in said ad information database is banner ad information.

5. The system for incorporating ad information into e-mails according to claim 1, wherein position data contained in the ad information stored in said ad information database specifies the position of an ad provider by latitude and longitude.

6. The system for incorporating ad information into e-mails according to claim 1, further comprising a display format detector for detecting an area information display format of an e-mail at a receiving terminal as a source of an e-mail transmission request when an e-mail transmission request is made by the receiving terminal or when the e-mail is transmitted to a destination e-mail server; and a display format converter for converting the display format of the area information in the e-mail to be transmitted to the receiving terminal to the display format of the receiving terminal when it is detected that the display format of the receiving terminal differs from the display format of the area information in the e-mail transmitted from the sending terminal.

7. A method for incorporating ad information into e-mails at an e-mail site including an e-mail server for saving an e-mail transmitted from a sending terminal and transmitting the e-mail to a receiving terminal based on a transmission request made by the receiving terminal, said method comprising the steps of:

detecting whether an e-mail transmitted from the sending terminal contains area information;

retrieving position information corresponding to the area information contained in the e-mail from a position information database that stores position information indicating a display range of area information when it is detected that area information is contained in the e-mail;

retrieving ad information positioned in the display range of said area information from an ad information database, where ad information containing ad data and position data of an ad provider is stored, the retrieved ad information being based on the position data and the position information of said retrieved area information; and inserting ad data contained in the retrieved ad information into the e-mail.

8. The method for incorporating ad information into e-mails according to claim 7, further comprising the step of specifying the display range of area information by latitude and longitude.

9. The method for incorporating ad information into e-mails according to claim 7, further comprising the step of specifying the position of the ad provider of said ad data by latitude and longitude.

10. The method for incorporating ad information into e-mails according to claim 7, further comprising the step of inserting said ad data into an e-mail transmitted from a sending terminal before saving the e-mail or before transmitting the e-mail to a destination e-mail server.

11. The method for incorporating ad information into e-mails according to claim 7, further comprising the steps of:

detecting an area information display format of an e-mail at a receiving terminal as a source of an e-mail transmission request when an e-mail transmission request is made by the receiving terminal or when the e-mail is transmitted to a destination e-mail server; and converting the display format of the area information in the e-mail to be transmitted to the receiving terminal to the display format of the receiving terminal when it is detected that the display format of the receiving terminal differs from the display format of the area information in the e-mail transmitted from the sending terminal.

12. The system for incorporating ad information into e-mails according to claim 1, wherein the area information corresponds to an area of the receiving terminal.

13. The method for incorporating ad information into e-mails according to claim 7, wherein the area information corresponds to an area of the receiving terminal.

* * * * *